US008265885B2

(12) United States Patent
George

(10) Patent No.: US 8,265,885 B2
(45) Date of Patent: Sep. 11, 2012

(54) SYSTEM AND METHOD FOR DETERMINING LIFETIME OF WIND TURBINE BLADE

(75) Inventor: Sheri George, Bangalore (IN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/167,931

(22) Filed: Jun. 24, 2011

(65) Prior Publication Data

US 2012/0029840 A1 Feb. 2, 2012

(51) Int. Cl.
*G01N 3/60* (2006.01)
*G06F 17/40* (2006.01)

(52) U.S. Cl. .............. 702/34; 702/42; 702/35; 702/136; 374/46; 374/57

(58) Field of Classification Search .................... 702/34, 702/42, 35, 41, 136
See application file for complete search history.

(56) References Cited

U.S. PATENT DOCUMENTS 6,966,754 B2 11/2005 Wobben
7,810,385 B1 * 10/2010 Narcus ....................... 73/112.01
2007/0098551 A1 * 5/2007 Viertl .............................. 416/61
2009/0107256 A1 4/2009 Jensen
2010/0052320 A1 * 3/2010 Hoffmann ....................... 290/44
2011/0246094 A1 * 10/2011 Olesen ........................... 702/34

OTHER PUBLICATIONS

Mark A. Rumsey and Joshua A. Paquette; "Structural Health Monitoring of Wind Turbine Blades"; SPIE-2008; 15 Pages.

Lovre Krstulović-Opara, Branko Klarin and Željko Domazet; "A non-destructive wind turbine blade analysis based on the Thermal Stress Analysis"; International Symposium on Coupled Methods in Numerical Dynamics; Sep. 16-19, 2009; 10 Pages.

P. Chatzakos, N. Avdelidis, K. Hrissagis, Tat-Hean Gan; "Autonomous Infrared (IR) Thermography based inspection of glass reinforced plastic (GRP) wind turbine blades (WTBs)"; IEEE Conference on Robotics Automation and Mechatronics (RAM), 2010, Jun. 28-30, 2010; pp. 557-562.

* cited by examiner

*Primary Examiner* — Hal Wachsman
(74) *Attorney, Agent, or Firm* — Richard A. DeCristofaro

(57) ABSTRACT

A method for monitoring stress on a wind turbine blade during loading is disclosed. The method includes capturing multiple images at respective locations of the blade. The method also includes measuring temperature at the respective locations based upon captured images. The method further includes calculating stress applied on the blade at the respective locations based upon the measured temperature. The method also includes calculating stress applied on the blade at the respective locations based upon the measured temperature. The method further includes comparing the calculated stress with respective theoretical stress in a finite element model to predict lifetime of the blade. The method also includes alerting an operator in event that the calculated stress at one or more of the respective locations is above a predetermined limit.

15 Claims, 3 Drawing Sheets

SYSTEM AND METHOD FOR DETERMINING LIFETIME OF WIND TURBINE BLADE

BACKGROUND

The invention relates generally to non-destructive evaluation of wind turbine blades, and more specifically, to stress measurements techniques.

Static and dynamic loading are typically employed in wind turbine blades for testing strength of the blades. While a static load is applied in the former case, a varying load or a cyclical load is applied in dynamic loading. Typically, various techniques are employed to measure stress on the blades during such a loading process.

A commonly known stress measurement technique employs strain gauges mounted on components such as blades, to measure stress indirectly. Generally, the blades are instrumented with strain gauges to measure strains at various locations. For example, about 120 strain gauges are mounted on a 37 m blade and about 20% of those are mounted on inside of the blade. Such measurements are compared to design specification limits and an alarm is set in an event that the measurements exceed specification limits However, the bonding of the strain gauges to the blade via an epoxy measure strain on a surface of the blade at a fixed location. Such measurements are affected by factors such as, but not limited to, rigidity of adhesion and orientation of strain gauges. Additionally, the strain gauge measurements may be affected by temperature variations. Furthermore, presence of wrinkles, delaminations or other defects on the blades may cause a change in the actual strain.

Accordingly, an improved stress measurement technique is needed to address the one or more aforementioned issues.

BRIEF DESCRIPTION

In accordance with an embodiment of the invention, a method for qualifying a wind turbine blade during loading is provided. The method also includes capturing multiple images at respective locations of the blade. The method further includes measuring temperature at the respective locations based upon captured images. The method also includes calculating stress applied on the blade at the respective locations based upon the measured temperature. The method further includes comparing the calculated stress with respective theoretical stress in a finite element model to predict lifetime of the blade. The method also includes alerting an operator in event that the calculated stress at one or more of the respective locations is above a pre-determined limit.

In accordance with another embodiment of the invention, a system for monitoring stress on a wind turbine blade during loading is provided. The system includes a camera configured to capture multiple images at respective locations of the blade. The system also includes a processor configured to receive multiple temperature measurements from the camera and calculate stress based upon the measurements. The processor also compares the calculated stress with respective theoretical stress in a finite element model to predict lifetime of the blade. The processor further alerts an operator in event that the calculated stress at one or more of the respective locations is above a pre-determined limit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention include a system and method for qualifying a wind turbine blade. The thermoelastic technique monitors stresses during fatigue testing of the blade/s. As used herein, the term 'fatigue testing' refers to cyclic application of load on the blade/s, for example, alternate cycles of compression and tension in opposite directions. Such a technique enables monitoring of stresses temporally and spatially on the blades. Furthermore, it enables identification of damaged locations on the blade/s and monitor propagation of damages during cyclic loading. Consequently, this technique enables estimation of strength of a material employed on the blade/s and lifetime of the blade/s. The objective of such technique is to estimate lifetime of the blade and the fatigue strength of the blade. It should be noted that although discussion below refers to wind turbine blades, the technique may be employed in various applications such as, but not limited to, propeller blades of helicopters and ships.

Figure 1:
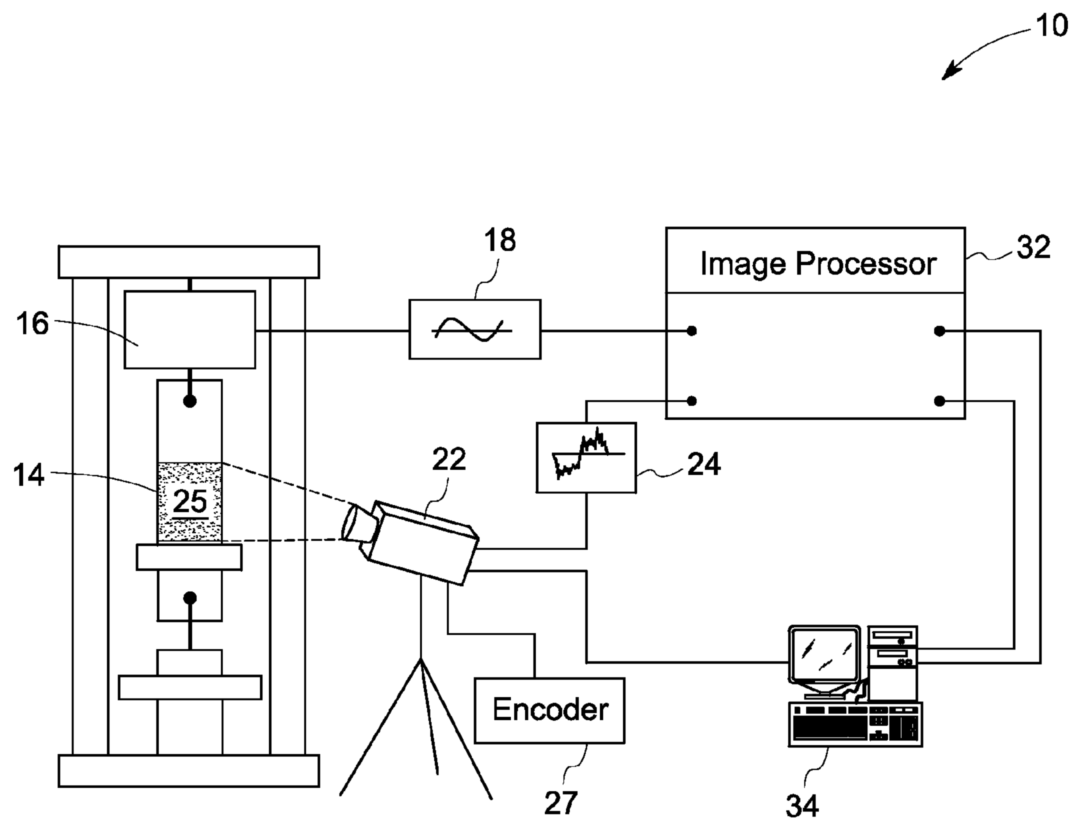
FIG. 1 is a schematic representation of a system for monitoring stresses on a typical wind turbine blade in accordance with an embodiment of the invention.
Figure 2:
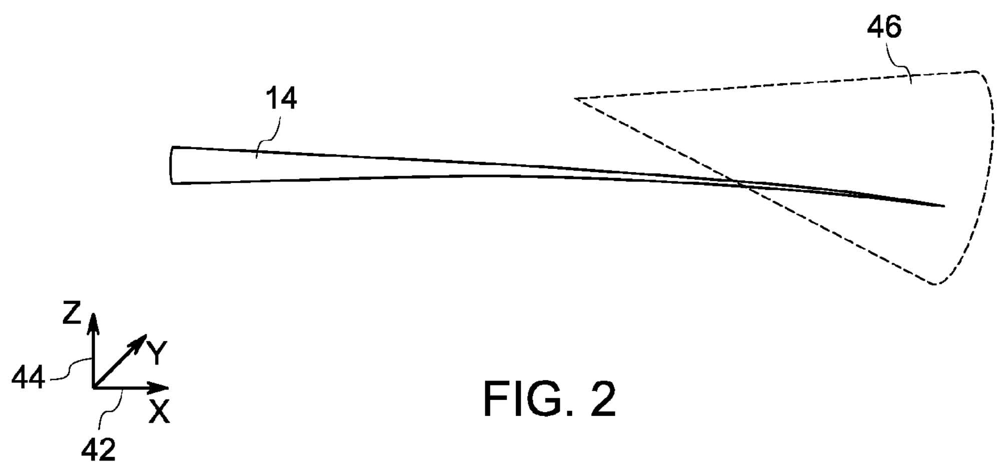
FIG. 2 is an exemplary scan configuration employed by the IR camera in FIG. 1.

FIG. 1 is a schematic representation of a system 10 for monitoring stresses on a typical wind turbine blade 14. The blade 14 is actuated by a loading machine or actuator 16 during a cyclic loading process. A lock-in signal 18 is tapped from the loading machine 16. The signal 18 includes information about amount of load being applied in terms of amplitude and frequency of the load. An infrared (IR) camera 22 is employed to continuously capture images 24 of the blade 14. The IR camera 22 measures temperature emitted through a surface 25 of the blade 14. In a particular embodiment, the camera 22 may measure a temperature change of about 20 mK. The IR camera 22 is positioned at different locations focusing on different sections of the blade 14. The IR camera 22 is also coupled/mounted on an encoder 27 that directs scanning mechanism of the camera 22. This determines the translational and rotational position of the camera 22, and also, field of view of the blade 14 covered by the camera 22.

In operation, the lockin signal 18 synchronizes with the cyclic load applied and initiates acquiring data at a point of maxima in the load applied. Such acquisition triggers the camera 22 to start capturing images of the blade 14. In a particular embodiment, the camera 22 may be disposed on a gantry (not shown) and rotates around different sections of the blade 14. Further, the camera actuates below the blade 14 and scans the surface. In one embodiment, the camera 22 may be located at a position where field of view is more than at least about 1 m. The lock-in processor 32 coupled to the camera 22 estimates accurate temperature emission and furthermore, stress on the blades and identifies damaged locations on the blade 14. The blade 14 may include markers that enable easier alignment of the blade for the different frames captured by the camera 22. In another embodiment, a laser (not shown) may be mounted on the camera 22 that produces a spot that may be used to align blades or for frame registration or motion compensation.

The processor 32 also eliminates ambient temperature effects on the temperature measurements and also, eliminates variations in measurement due to noise. Furthermore, a motion compensation algorithm is employed by the processor 32 to nullify variations in the position of the blade 14 during cyclic loading process. Stresses on the blade 14 that are measured are mapped on a CAD model using techniques such as, but not limited to, bilinear transforms, affine registration or perspective registration. Mapping is performed for pressure and suction sides of the blade 14. The mapped stress model may further be compared with the predictions of a finite element analysis (FEA) model for detection of variation in measured stresses from the predicted stresses. Thus, high stress/damaged locations may be determined. The time intervals between detection of high stresses and damage initiation are noted. The growth of the damages during loading process is monitored and the rate of the damages are estimated. Furthermore, mapped stress data on CAD model are subjected to a finite element model (FEM) to predict lifetime of the blade 14. An operator is alerted in an event that the stresses measured are beyond pre-determined limits.

It should be noted that embodiments of the invention are not limited to any particular processor for performing the processing tasks of the invention. The term "processor" as that term is used herein, is intended to denote any machine capable of performing the calculations, or computations, necessary to perform the tasks of the invention. The term "processor" is intended to denote any machine that is capable of accepting a structured input and of processing the input in accordance with prescribed rules to produce an output.

Figure 3:
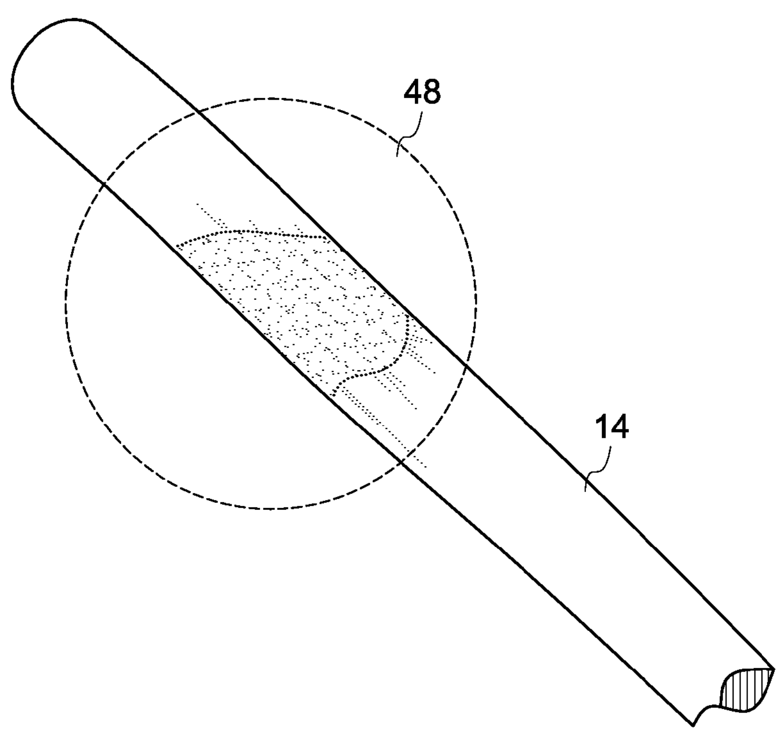
FIG. 3 is a schematic illustration of a view in the direction of the camera in FIG. 1.
Figure 4:
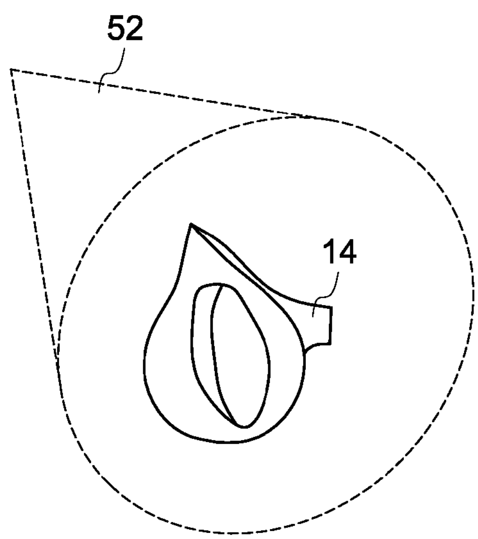
FIG. 4 is a side view of the blade 14, as captured by the camera in FIG. 1.
Figure 5:
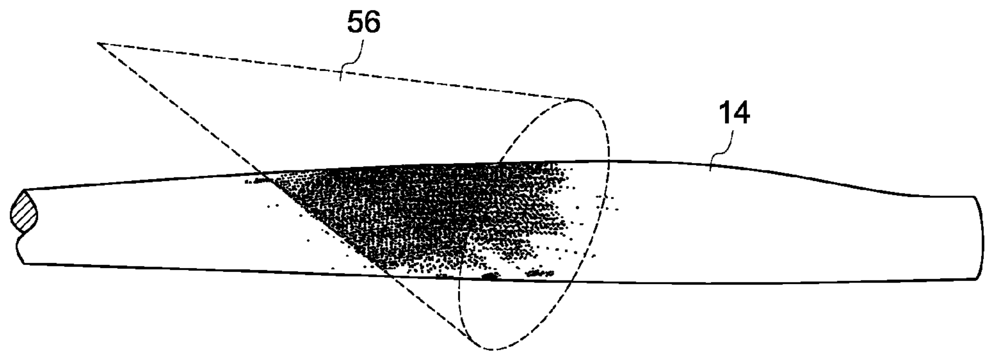
FIG. 5 is a front view of the blade 14, as captured by the camera in FIG. 1.

FIGS. 2-5 are exemplary scan configurations employed by the IR camera 22 in FIG. 1. In the exemplary embodiment in FIG. 2, the camera 22 is positioned at about 5 m from blade 14 in X-direction referred by reference numeral 42 and 5 m in the Y-direction 44 and has a field of view as depicted by region 46. Similarly, FIG. 3 illustrates a view in the direction of the camera 22 with a field of view 48 of the blade 14, while FIGS. 4 and 5 illustrate a side view and a front view respectively with fields of view 52 and 56 respectively.

Figure 6:
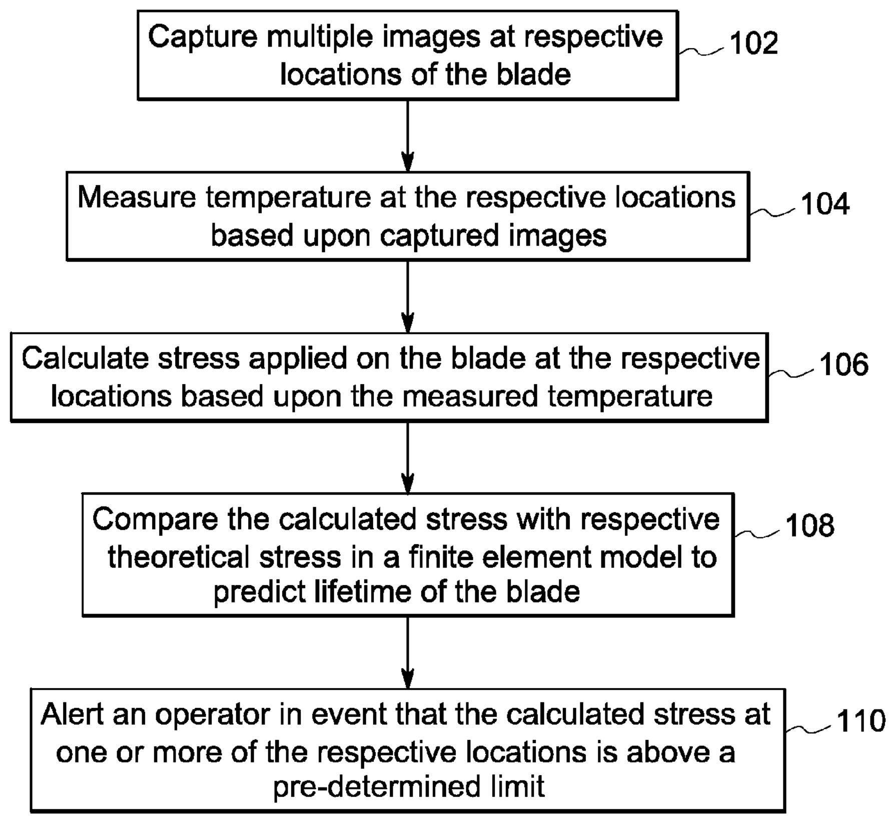
FIG. 6 is a flow chart representing steps in a method for monitoring stresses in a wind turbine blade in accordance with an embodiment of the invention.

FIG. 6 is a flow chart representing steps in a method for monitoring stresses on a blade. The method includes capturing multiple images at respective locations of the blade in step 102. In one embodiment, a camera is scanned at multiple sections of the blade to capture the images. In another embodiment, images are captured after triggering of the camera via a lock-in signal. Furthermore, temperature is measured at the respective locations based upon the captured images in step 104. Stress being experienced by the blade is calculated at the respective locations based upon the measured temperature in step 106. In a particular embodiment, ambient temperature effects are eliminated prior to calculating the stress. In another embodiment, variations in temperature measurements due to noise are eliminated. In yet another embodiment, any shifts in position of the blade during loading process is eliminated via a motion compensation algorithm. In another embodiment, stress is mapped on a CAD model in step 108. In yet another embodiment, the stress is compared to a finite element analysis to predict lifetime of the blade. Analytical and finite elemental models are used on this stress mapped CAD model to estimate the remaining life of the blade. An operator is alerted in step 112 in event that the calculated stress at one or more of the respective locations is above a pre-determined limit.

The various embodiments of a system and method for qualifying a wind turbine blade described above thus provide a way to achieve a convenient and efficient means of measuring stress during the loading process. This technique also provides for non-contact, remote measurement and precise readings. The technique also eliminates usage of strain gauges that are currently employed thus resulting in a cost effective means of measurement. Furthermore, the technique allows for online monitoring of an entire surface (both sides) of the blade for stress measurements, thus enabling higher accuracy readings.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for qualifying a wind turbine blade during loading, the method comprising:

capturing a plurality of images at respective locations of the wind turbine blade while the wind turbine blade is subject to loading;

measuring temperature at the respective locations based upon the captured images;

calculating stress within the wind turbine blade at the respective locations based upon the measured temperature by correlating the temperature change measured via the captured images with a known stress level associated with such temperature change;

comparing the calculated stress with a respective theoretical stress in a finite element model of the wind turbine blade to detect stresses that indicate damage within the wind turbine blade and using such indicated damage during loading to predict lifetime of the wind turbine blade; and alerting an operator in event that the calculated stress at one or more of the respective locations is above a pre-determined limit.

2. The method of claim 1, wherein said calculating stress comprises eliminating ambient temperature effects.

3. The method of claim 1, wherein said calculating stress comprises eliminating variations due to noise.

4. The method of claim 1, wherein said calculating stress comprises eliminating shift in position of the wind turbine blade during a loading process.

5. The method of claim 1, wherein said capturing the plurality of images comprises scanning a camera at different sections of the wind turbine blade.

6. The method of claim 1 further comprising triggering the capturing of said images via a lock-in signal.

7. The method of claim 1, further comprising mapping of the stress on a CAD model.

8. A system for monitoring stress on a wind turbine blade during loading, the system comprising:

a camera configured to capture a plurality of images at respective locations of the wind turbine blade while the wind turbine blade is subject to loading; and a processor containing instructions that when executed cause the processor to perform the following steps:

receive a plurality of temperature measurements from the camera; and calculate stress within the wind turbine blade based upon the temperature measurements by correlating the temperature change measured via the captured images with a known stress level associated with such temperature change;

compare the calculated stress with a respective theoretical stress in a finite element model of the wind turbine blade to detect stresses that indicate damage within the wind turbine blade;

use the indicated damage during loading to predict lifetime of the wind turbine blade; and alert an operator in event that the calculated stress at one or more of the respective locations is above a predetermined limit.

9. The system of claim 8, further comprising an actuator coupled to the wind turbine blade to apply a load on the wind turbine blade.

10. The system of claim 8, wherein said camera captures the plurality of images based upon a triggering via a lock-in signal.

11. The system of claim 8, wherein said camera comprises an infrared camera.

12. The system of claim 8, wherein said camera is positioned at a field of view distance of at least 1 m from a surface of the wind turbine blade.

13. The system of claim 8, wherein said instructions contained within said processor further include instructions that when executed cause the processor to perform the steps of motion compensation or frame registration to eliminate variations in position of the wind turbine blade encountered during said loading.

14. The system of claim 8, wherein said instructions contained within said processor further include instructions that when executed cause the processor to perform the step of eliminating ambient temperature effects.

15. The system of claim 8, wherein said instructions contained within said processor further include instructions that when executed cause the processor to perform the step of eliminating variations in the temperature measurements due to noise.

* * * * *